(12) United States Patent
Johansen

(10) Patent No.: US 10,852,232 B2
(45) Date of Patent: Dec. 1, 2020

(54) MODULATED FABRY-PEROT

(71) Applicant: Tunable AS, Oslo (NO)

(72) Inventor: Ib-Rune Johansen, Oslo (NO)

(73) Assignee: Tunable AS, Oslo (NO)

( * ) Notice: Subject to any disclaimer, the term of this patent is extended or adjusted under 35 U.S.C. 154(b) by 45 days.

(21) Appl. No.: 16/310,593

(22) PCT Filed: Jun. 22, 2017

(86) PCT No.: PCT/EP2017/065364
§ 371 (c)(1),
(2) Date: Dec. 17, 2018

(87) PCT Pub. No.: WO2018/001851
PCT Pub. Date: Jan. 4, 2018

(65) Prior Publication Data
US 2019/0265163 A1    Aug. 29, 2019

(30) Foreign Application Priority Data
Jun. 29, 2016  (NO) .................................. 20161086

(51) Int. Cl.
*G01J 3/26*     (2006.01)
*G01N 21/45*    (2006.01)
*G02B 26/00*    (2006.01)

(52) U.S. Cl.
CPC ............... *G01N 21/45* (2013.01); *G01J 3/26* (2013.01); *G02B 26/001* (2013.01)

(58) Field of Classification Search
CPC .... G01N 21/45; G01J 3/02; G01J 3/26; G01J 3/45; G02B 5/284
See application file for complete search history.

(56) References Cited

U.S. PATENT DOCUMENTS 8,724,200 B1 *  5/2014  Wu .................... G02B 26/0858
                                                     359/224.1
2003/0011864 A1   1/2003  Flanders
(Continued)

FOREIGN PATENT DOCUMENTS

EP      2557441 A1    2/2013
JP    H10335693 A    12/1998
(Continued)

OTHER PUBLICATIONS

Denise, Christophe, "International Search Report," prepared for PCT/EP2017/065364, dated Sep. 20, 2017, four pages.
(Continued)

*Primary Examiner* — Jonathan M Hansen
(74) *Attorney, Agent, or Firm* — Shackelford, Brown, McKinley & Norton, LLP

(57) ABSTRACT

The present invention relates to a Fabry-Perot interferometer including two plane mirror surfaces mounted in a frame and a system including the interferometer. The mirrors have a known distance between them, and at least one of the mirror surfaces is both partially reflective and partially reflective, where there are at least two actuator units, each including at least one actuator. The first actuator unit is adapted to adjust said distance between said mirrors and the second actuator unit is adapted to modulate said distance at a chosen frequency, both thus providing a variation over a range of mirror distances corresponding to a range of filtered wavelengths in said Fabry-Perot interferometer. At least one of said mirrors is related to the frame through a silicon membrane, at least one of said actuator units comprising a piezoelectric material on said membrane, thus constituting a bimorph or unimorph actuator unit.

15 Claims, 6 Drawing Sheets

(56) References Cited

U.S. PATENT DOCUMENTS

2013/0279005 A1    10/2013  Sano
2015/0318799 A1*   11/2015  Hirokubo ............... G05B 11/14
                                                    359/584
2018/0149857 A1*   5/2018   Nozawa ................ G01J 3/0208

FOREIGN PATENT DOCUMENTS

NO        20093022 A1       3/2011
WO    WO-2011033028 A1      3/2011
WO    WO-2017089624 A1      6/2017

OTHER PUBLICATIONS

Bakke, Thor, et al., "A Novel Ultra-Planar, Long-Stroke and Low-Voltage Piezoelectric Micromirror," Journal of Micromechanics & Microengineering, Institute of Physics, vol. 20, No. 6, Jun. 1, 2010, seven pages.

Poulter, et al., "A Servo-Controlled Fabry-Perot Interferometer for the FIR," Infrared Physics, Pergamon, vol. 24, No. 1, Jan. 1, 1984, pp. 35-42.

* cited by examiner

MODULATED FABRY-PEROT

This invention relates to a new type of tuneable optical filter of the Farby-Perot (FP) type.

The usual way to use a tuneable Fabry-Perot, e.g. as discussed in WP2011/0033028 and EP2557441, is to make a wavelength scan by changing the distance between the mirrors in an essentially constant speed, sampling the spectral response and analyzing this digitally. In order to reduce the 1/f noise one may wish to perform many scans per second. Usually the scan frequency is limited by the mass of the moved mirror, the spring stiffness and available power. Assuming that it is possible to scan the Fabry-Perot-filter at $\Omega=10$ Hz in this way. Ideally a detection frequency at 1000 Hz may be required. This may be obtained by adding a high frequency sinus (or periodic signal) modulation at f=500 Hz, and then demodulate the signal at 2*f, and thus detect at the 2 harmonic, in the same way that harmonic detection in diode laser spectrometry. The scan movement off is typically much less than the scan movement for $\Omega$. A Fabry-Perot (FP) made with unimorph (or bimorph) actuators of piezoelectric materials on silicon can typically perform $10^{10}$ full scans. Which is scan from one outer end to the other. This corresponds to 10 years use at 30 Hz, or one year use at 300 Hz. It will therefore be advantageous to greatly reduce the number of full scans, or rather obtain the high frequency by using a superimposed sinus.

Lead zirconate titanate (PZT) is a piezoelectric material which is well suited. A PZT FP which is made with unimorph actuators on silicon will typically experience breakage, delamination or short circuiting due to repeated bending at high strain, especially when the bending is at a maximum. Thus, it is an object of the present invention to provide a tunable Fabry-Perot filter with an increased life time. This is obtained as defined in the accompanying claims.

The present invention therefore propose that the scan, or wavelength adjustment, is done with the an actuator being separate from a second actuator that is made with a lower strain and where the modulation frequency f is applied. This will lead to strain reduction as the second actuator is closer to the zero point and the amplitude of the modulation frequency f is much less than the total wavelength scan. This will increase the life time significantly. One may also make the second actuator with a thinner PZT which reduces strain but also less mechanical movements. Or one may make the second actuator of PZT with less strain. These typically will give longer life time, but less mechanical movements. This may for example be obtained by modifying the bottom electrode, etch the PZT a little to change the growth structure or by heat treatment in the corresponding area in a certain way.

Another alternative is making a second actuator with electrostatic modulation. The electrostatic modulation has a short stroke length, and is not suitable for scanning over a larger wavelength range, but on the other hand it may operate for a large number of cycles. Thus scanning with a PZT actuator and modulation at a frequency f with an electrostatic actuator. The electrostatic actuator may be of a plate type or finger/cam or vertical cam type.

The actuator may also be electromagnetic, where for example a magnet is mounted on the moving part of the FP and the high frequency scanning is provided by applying a magnetic field, as in a loud speaker or electromotor. Or an electrical conductor, such as a coil, may be mounted in the moveable FP part, and use an external magnet for providing a field, so that it is possible to scan the filter fast.

The actuator may also be thermal, and where the PZT actuator is used for fast modulation. The actuators may also be made as PZT bimorph. PZT is only one of several piezoelectric materials being suitable for actuators, and in addition there are many electrostrictive materials that may be suitable.

Further it is a point to avoid the squeeze film effect or damping of the modulation at high frequency. The squeeze film effect is caused by air that must away from the narrow channel between two surfaces. Mirrors made form a photonic crystal have large though going openings and these may function as relief channels to reduce the squeeze film effect. Another alternative is to reduce the damping of the modulation by packing the sensor in vacuum.

Other types a mirrors are suitable for multi layer mirrors (interference filter/mirror), metallic mirrors, combination of metallic mirrors and multilayer mirrors, mirrors based on photonic crystals or mirrors based on surface plasmons. Mirrors based on surface plasmons may for example be made using patterned metal on an optically transmitting substrate.

With electrostatical modulation it may be advantageous to use an end stop so as to avoid surfaces sticking together. Typically, such an end stop will be constituted by one or more non-conductive spacer block, e.g. made from silicon oxide. The size of the spacer blocks may be as small as possible to avoid that the surfaces sticking together, so-called stiction.

Measuring the distance between the mirrors in the Fabry-Perot interferometer may be performed with a number of different techniques, for example sensors based on capacitive measurements, optical triangulation, optical near field, interferometric measurements, piezoelectric measuring principles, magnetic and inductive measurements, and many of them are suitable for integration in silicon.

A Fabry-Perot that can be modulated is especially suited for use in photoacoustic applications. Often an amplitude modulator (chopper) is used to modulate the light entering into the photoacoustic cell. This often leads to an absorption of some of the light in the walls and window of the photoacoustic cell, which generates a photoacoustic signal. This photoacoustic signal from walls and windows thus give a significant offset (baseline) and will make it difficult to measure the weak signals being sought, in example the concentration of a gas. If a broad band optical source is used having essentially the same power over the related wavelength range, modulation of the wavelength will not lead to a modulation of the optical power. This is described in detail in WO2017/089624 which is incorporated here by way of reference.

Wavelength modulation does not lead to an offset signal generated from windows and walls (or at least reduce the signal significantly), and it is easier to measure weaker signals and it is also easier to make sensors with low drift (long term stable zero point).

The invention will be discussed more in detail below with reference to the accompanying drawings illustrating the invention by way of examples. Where FIG. 1 illustrates the cross section of a possible way to make a Fabry-Perot interferometer.

Figure 1:
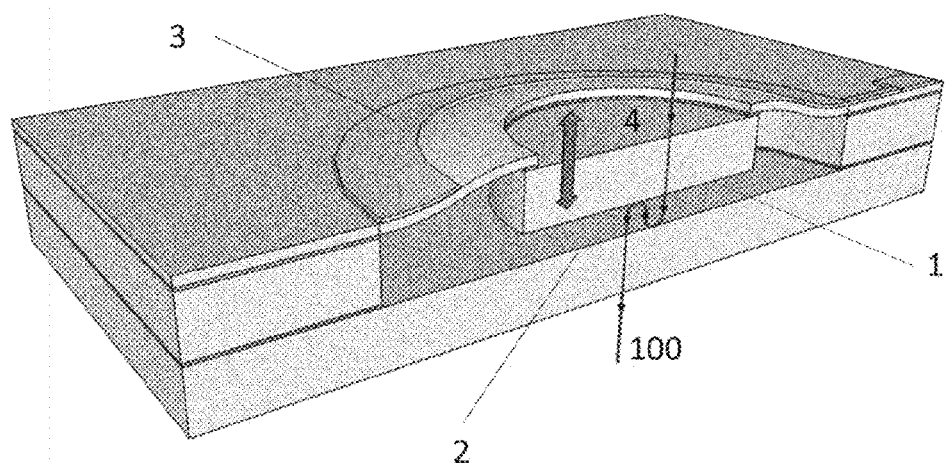

FIG. 1 shows a known solution for making a Fabry-Perot where the wavelength can be tuned electrically. Two mirrors 2, 4 facing each other providing a resonator for light 100 passing through them. The upper mirror part 4 is mounted to a frame through a membrane, thus providing movements by using an actuator. The mechanical movement is made using a piezoelectric actuator 3. The piezoelectric actuator 3 of e.g. PZT is mounted on the membrane e.g. being machined in a silicon disk/wafer. The mounting may for example be performed using CSD (Chemical Solgel Deposition), PLD (Pulsed Laser Deposition) or sputtering. Together the layer of PZT on a layer of silicon constitutes a unimorph. When a positive voltage is applied over the PZT layer it contracts while the silicon layer does not. As the two materials are fixed to each other the contraction of the PZT makes the unimorph bend, and by changing the electrical voltage over the piezoelectric actuator 3 it is possible to move the transmitting element up and down. If the optical element is plane and has a partially reflective and partially transparent coating 1 on the surface, and if this is mounted together with another transmitting surface being coated with a partially reflective and partially transparent coating 2, and if these two surfaces in addition are parallel, these surfaces 1 and 2 will constitute a Fabry-Perot interferometer. By adjusting the distances between the two surfaces one may control which wavelength or wavelengths 100 being transmitted.

As mentioned above the Fabry-Perot interferometer in FIG. 1 may be made from silicon. One will then typically use two silicon disks/wafers. The lower silicon wafer in FIG. 1 will typically have a mirror coating 2 into the air gap in the Fabry-Perot interferometer, and electrodes 9, 10 (FIG. 2) will often be positioned on the same surface, for efficiently measuring the distance in the air gap between the mirror surfaces 1, 2. On the side of the silicon disk facing away from the airgap an anti-reflection coating is often used. From FIG. 1 we can see that the upper silicon disk will often have a mirror coating 1 facing the air gap in the Fabry-Perot interferometer, and we see that the upper silicon disk is divided, one so-called SOI-disk (silicon on insulator) with a thick substrate layer under and a thin component layer (device) on top. The thin component layer together with the piezoelectric layer constitutes the unimorph actuator. The optical element 4 and the unimorph actuator is usually micromachined with dry etching (DRIE) so as to be moveable. At last the two disks are mounted together, often with a spacer block between them.

Figure 2:
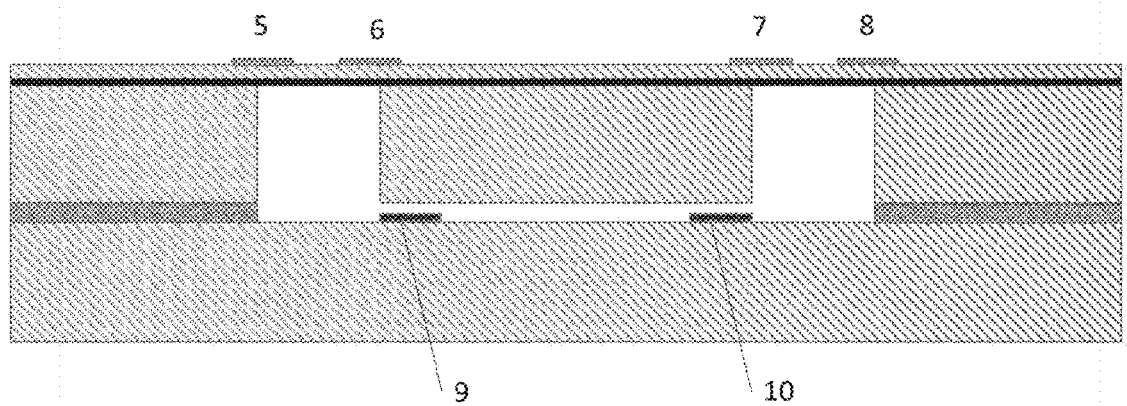
FIG. 2 illustrates a cross section of an embodiment of the invention.

For a Fabry-Perot interferometer to function as a spectrometer it is necessary for the two reflective surfaces to be parallel. In order to make sure they are parallel a number of actuators may be used for controlling their parallelism. FIG. 2 shows how one may use outer actuators 5, 8 close to the frame to control both the distance between the mirrors and possibly the parallelism. The parallelism and distance may be measured using capacitive sensors, here marked as electrodes 9 and 10. The upper element including the upper mirror 4 may for example be grounded, and it is then possible to read the distance from electrodes 9, 10 to the upper element by measuring the capacitance. The outer actuators 5, 8 may also be used to adjust the distance between the mirrors and thus the wavelength being transmitted through the Fabry-Perot interferometer. The inner actuators 6, 7 may then be used to apply a modulation of the wavelength. This modulation may for example be a sinus modulation with a frequency f, and the frequency may be between 10 Hz and 100 kHz, but will typically be between 10 and 1000 Hz. The modulation will make the wavelength transmitted through the filter change with the modulation frequency, and often is harmonic detection used, where the signal is demodulated at frequencies f, 2f, 3f, 4f, or a higher multiple of the frequency. The advantage with harmonic detection is that the variations in the amplitude information from source and others is reduced, so that the signal is robust to changes in sources amplitude and similar. Amplitude of wavelength modulations and which multiple of the frequency f (and phase) that is used for demodulation will typically depend on the width of the spectral feature that is to be measured, as well as the characteristics of any interfering components (as is known). The modulation amplitude can be sinusoidal or have other amplitude forms such as triangular, rectangular or other modulation amplitudes that have been tested within for example diode laser spectroscopy.

In the example above the outer actuators 5, 8 was used to adjust the wavelength, and the inner actuators 6, 7 was used to modulate the wavelength. This could of course be opposite, so that inner actuators 6, 7 may be used to adjust the wavelength and outer actuators 5, 8 for modulating the wavelength. In some cases, it is advantageous to use the actuators to provide a tilt to the mirror, and that the modulation is obtained by changing the width and amplitude of the transmitted signal.

In one embodiment an actuator unit, e.g. with the outer actuators 5, 8, may be used to adjust the wavelength, and this wavelength adjustment may for example be performed with a ramp which is repeated at a frequency F. The frequency F will typically be much less than the modulation frequency f. In practice one will often use a ramp (saw tooth) with a frequency F between 0.01 and 10 Hz, where the transmitted wavelength in example starts at 3 micrometer and the wavelength linearly increases with time up to i.e. 6 micrometers within each period of F. The wavelength range of 7-14 micrometers is also of strong interest for gas detection.

In other embodiments, it is advantageous to adjust the wavelength in steps. One will then typically find a number of wavelengths suitable for a given application, and then adapt the wavelength for the first measurement for the first set of actuators and keep this wavelength for a certain time, while using a different set of actuators to modulate with a frequency f, and demodulate the measured signal for the given time frame. Then step the wavelength to the next position. If the modulation is symmetrical around the adapted wavelength the medium distance between the mirrors will not change, and if one averages over a sufficiently long time frame the measured mean value will not be substantially affected by the modulation. One may then use the electrodes 9 and 10 to measure the distance up to the upper mirror in FIG. 2.

If the distance measured with modulation differ from the distance measured without modulation, this may indicate that the modulation amplitude is affected by squeeze film effect or other disturbing effects, and this can be corrected by systematically mapping the behavior and adding correcting algorithms. This will typically be relevant when using piezoelectric actuators such as PZT, where the material has a strong hysteresis, and where the real amplitude of the displacement may be a function of voltages applied earlier.

If the modulation is i.e. a sinus, but a DC component is added, so the modulation signal varies between zero and maximum A (i.e. $A*(1+\sin(\omega t))$), the averaged distance measured will give an estimate of the center wavelength, and the averaged distance measured without the modulation will give an estimate of the wavelength at zero modulation, these two numbers can be used to give an estimate of the modulation depth. The total modulation depth will then typically be twice the wavelength difference between with and without modulation. This is useful when one set of actuators is used to tune the wavelength, and another set of actuators is used to perform the modulation.

Figure 3:
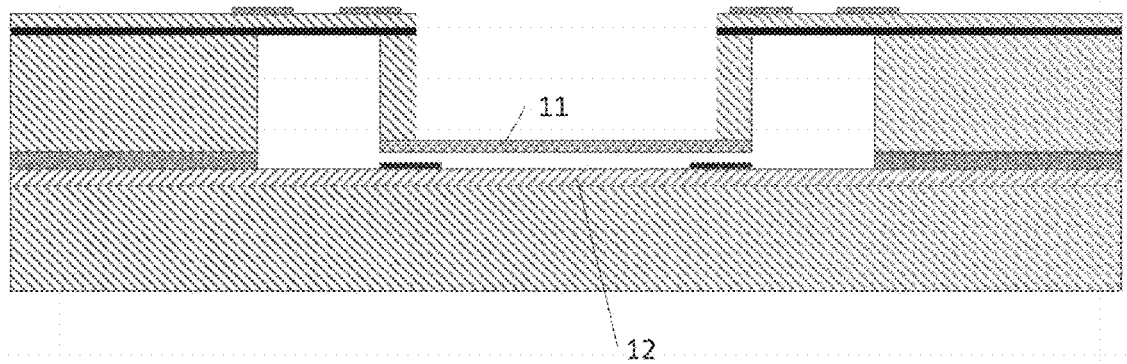
FIG. 3 illustrates a cross section of a second embodiment of the invention.

FIG. 3 shows an alternative embodiment with a different mount of the upper mirror surface 11. One or both of the mirror surfaces 11 and 12 can be made as photonic crystal membranes. In some embodiments, it may be interesting to avoid the squeeze film effect, or to dampen the modulation at high frequencies. Photonic crystal membranes used as mirrors have large thoroughgoing holes and these constitute as relief channels for the squeeze film effect, which may be obtained in FIG. 3 by the upper mirror 11 proving channels to the space outside the Fabry-Perot cavity. Other types of mirrors that may be used are multi layer mirrors (interference filter/mirror), metallic mirrors, mirrors based on photonic crystals and mirrors based on surface plasmons, or mirrors based on combinations of the mirrors above. FIG. 3 also shows how in some cases it may be advantageous to remove the substrate so as only to have a remaining membrane 11.

Figure 4:
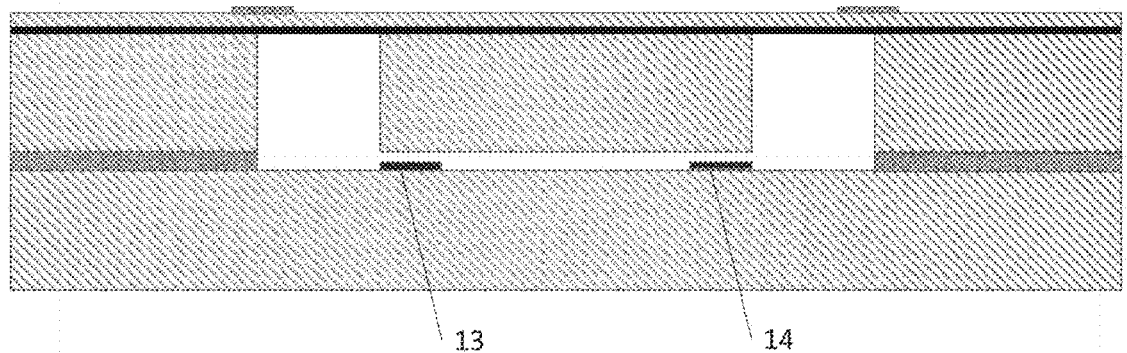
FIG. 4 illustrates a cross section of a third embodiment of the invention.

FIG. 4 shows an embodiment where a set of actuators on the upper surface is used to adjust the distance and wavelength, while a set of electrodes 13 and 14 may be used as both position and modulation actuators. As in FIG. 2 this may include grounding the upper silicon disk and insulating the interface between the disks.

Figure 5:
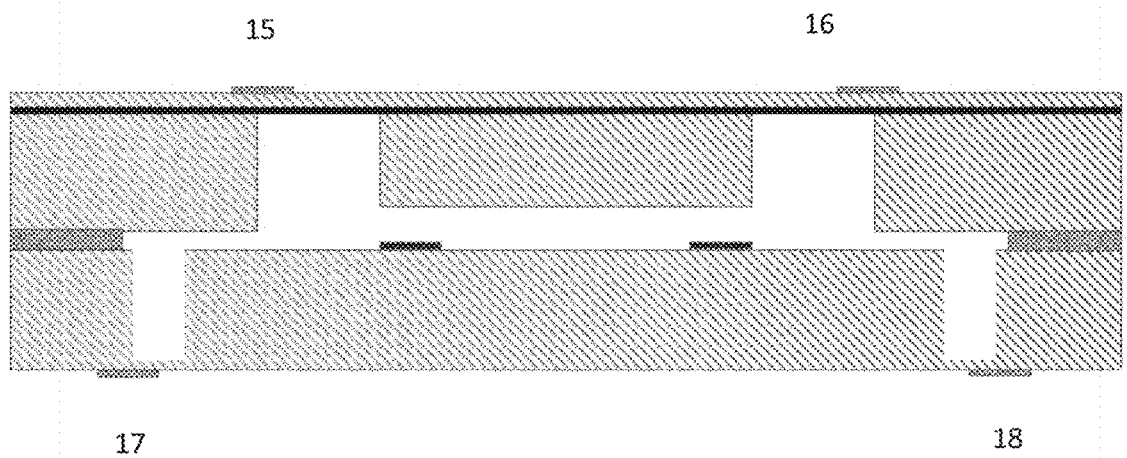
FIG. 5 illustrates a cross section of a fourth embodiment of the invention.

FIG. 5 shows an embodiment where the first set of actuators 15 and 16 is used for adjusting the wavelength and the second set of actuators 17 and 18 is used for modulation. Or the first and second set may change functionality. In the embodiment in FIG. 5 the actuator set is positioned on each side of the Fabry-Perot gap (i.e. on the top disk and on the bottom disk). The two moveable parts may be formed with different width, and they may advantageously be made with the same mass and spring constant (or resonance frequency) so that external influences have essentially the same effect on them.

Figure 6:
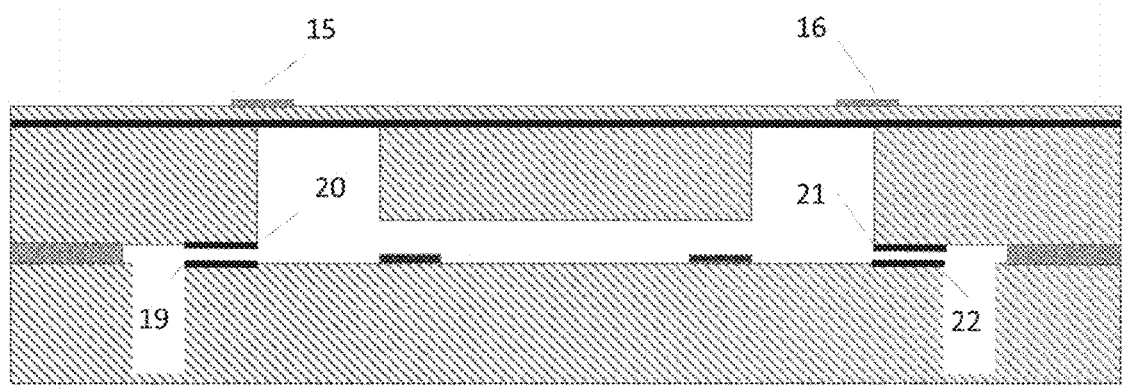
FIG. 6 illustrates a cross section of a fifth embodiment of the invention.

FIG. 6 shows an embodiment where a first actuator unit with actuators 15, 16 mounted on the upper disk membrane are used to adjust the wavelength, and where a second actuator unit including a first and second set of electrodes 19, 20 and a electrodes 21 and 22 is used to modulate the wavelength by applying a voltage between the sets. In addition, there are two electrodes under the center element that may be used to measure the distance between the silicon disks and thus the wavelength. By applying a voltage over the first set of electrodes 19, 20 but not in the second set 21, 22 it is possible to tilt the Fabry-Perot gap, and by applying a voltage over the second set of electrodes 21, 22 at the same time as the first set of electrodes 19, 20, one may make the Fabry-Perot air gap contract. By adding a square voltage modulation a binary modulation may be obtained where the wavelength is changed between two positions, which is suitable for derivative spectroscopy. It is then often preferable to move the electrodes completely together, only separated by a spacer. One may also modulate the distance between the electrodes with other modulation curve shapes, such as sinusoidal, but that would require measures against pull-in, i.e. that the electrodes are drawn completely together.

Figure 7:
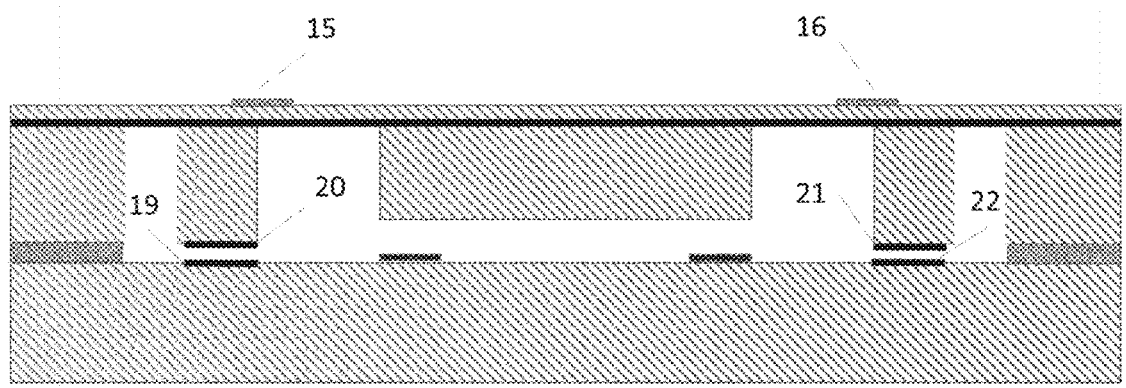
FIG. 7 illustrates a cross section of a sixth embodiment of the invention.

FIG. 7 shows another embodiment of the same principle as in FIG. 6, but where all of the moving parts and membranes are on the same side.

Figure 8:
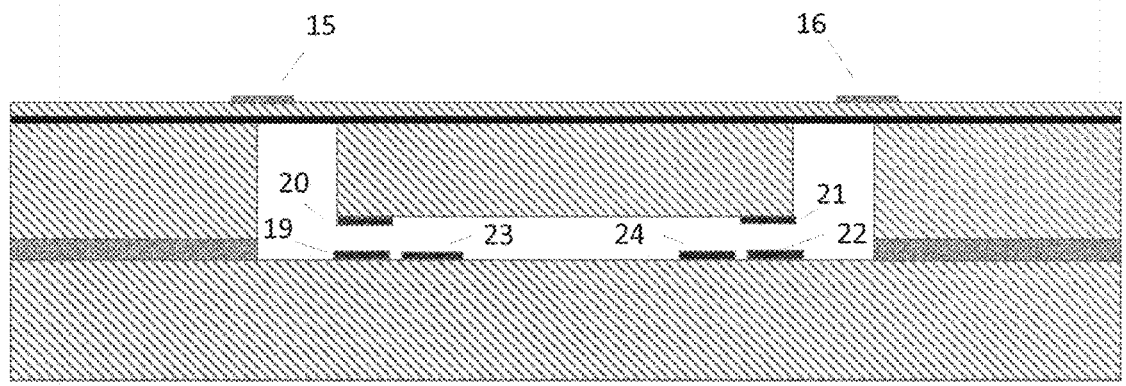
FIG. 8 illustrates a cross section of a seventh embodiment of the invention.

FIG. 8 illustrates a simplified version of the embodiments in FIGS. 6 and 7, where the number of moving parts/areas is reduced. The first set of actuators 15, 16 are used to adjust the wavelength, while a set of electrodes 19, 20, 21 and 22 are used to modulate the wavelength. In addition an extra set of electrodes 23 and 24 are used to measure the distance in the air gap in the Fabry-Perot interferometer. The advantage of this version is that there are fewer moving parts, but the disadvantage is that the range of the mechanical movement is given by the electrostatic modulation and will change as the function of the wavelength. In some embodiments this will be an advantage, if the reduction in modulation amplitude with scan length gives better resolution between interfering gases, but usually it will be a disadvantage, since a constant modulation amplitude often is preferred.

Figure 9:
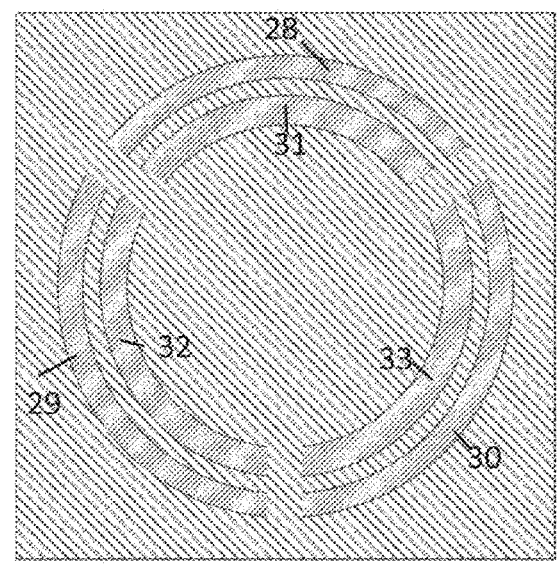
FIG. 9 illustrates an example of a possible embodiment of an actuator.
Figure 10:
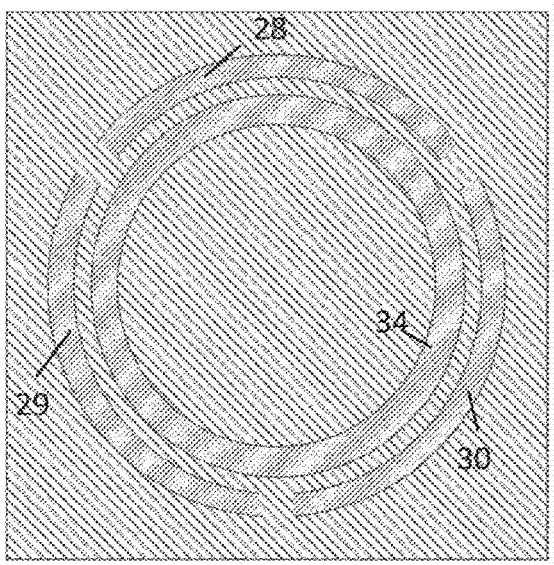
FIG. 10 illustrates a second possible embodiment of an actuator.

FIGS. 9 and 10 illustrates and embodiment where a set of actuators 28, 29 and 30 is used to adjust the wavelength. The actuators may for example be unimorph made from PZT and Silicon. Here three actuators are used to be able to adjust both height and parallelism.

Figure 11:
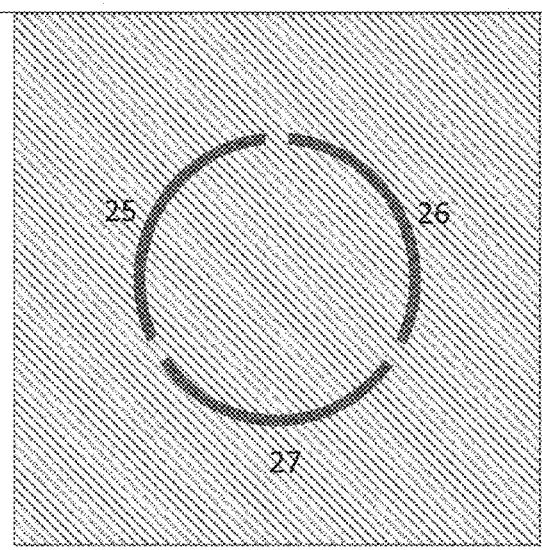
FIG. 11 illustrates a possible positioning of electrodes for capacitive distance measuring.

FIG. 11 shows how the electrodes in the bottom wafer is mounted. Three electrodes are used to measure both height and parallelism. The electrodes are mounted so that they are close to the moveable optical element 4 (mirror?). The electrodes 25, 26 and 27 are mounted so that they are rotated in relation to the actuators in FIG. 9, as shown in FIG. 11, or they are mounted with the same orientation as the actuators. What is optimal will depend on the control and regulation algorithm being used. In FIG. 9 a set of actuators 31, 32 and 33 are used to modulate the wavelength. In FIG. 10 only one actuator ring 34 is used for modulation. As the modulation length usually is very low compared to the total adjustment length (range) of the Fabry-Perot interferometer, it will also be possible to obtain a good modulation with only a ring actuator. As the PZT material, strain and thickness often varies it has turned out to be necessary to use several actuators if adjustments over a wider wavelength range is needed. In FIG. 9 one may easily change between which set of actuators that is used for modulation or wavelength adjustments. In FIG. 10 it is also possible to change, but less suitable.

Figure 12:
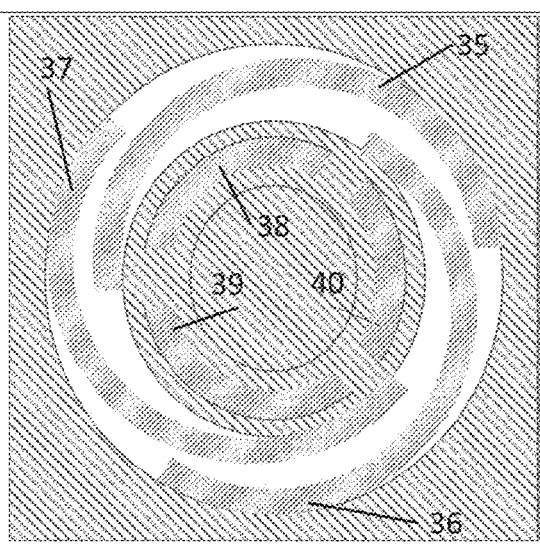
FIG. 12 illustrates a third possible embodiment of an actuator.

In the embodiment in FIG. 12 there are three spiral arms with actuators 35, 36 and 37. These spiral shaped arm may advantageously be made in the whole thickness of the silicon wafer, or they may be made only in the upper layer (device layer). If the actuator is of a unimorph type the actuator should preferably not cover the whole arm, but only from one fastening point and on approximately to the middle. The one set of actuators 35, 36 and 37 may advantageously be used to adjust the wavelength, while the other set of actuators 38, 39 and 40 advantageously may be used for wavelength modulation, but it is possible to change the functionalities between the actuator sets.

Figure 13:
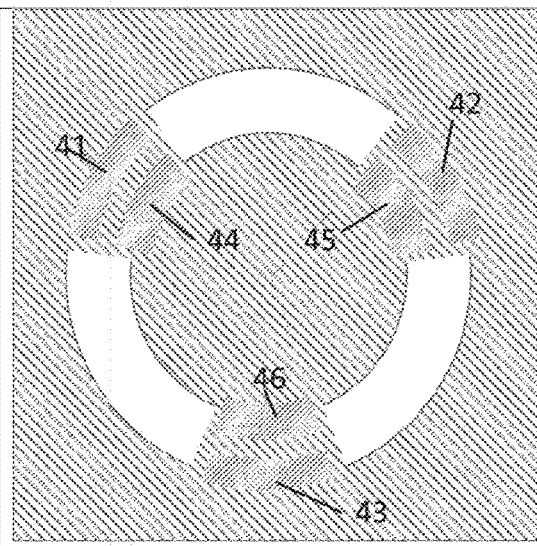
FIG. 13 illustrates a fourth possible embodiment of an actuator.

FIG. 13 shows an embodiment where the actuators are positioned on three beams. The beams may the same width over the whole length or reducing width as shown in the drawing. A set of actuators 44, 45 and 46 may be used for modulation and another set 41, 42 and 43 may be used for adjusting wavelength, or the other way around.

Figure 14:
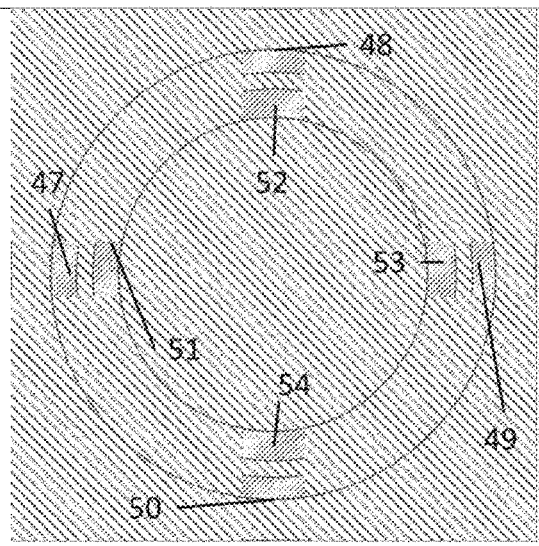
FIG. 14 illustrates a fifth possible embodiment of an actuator.
Figure 15:
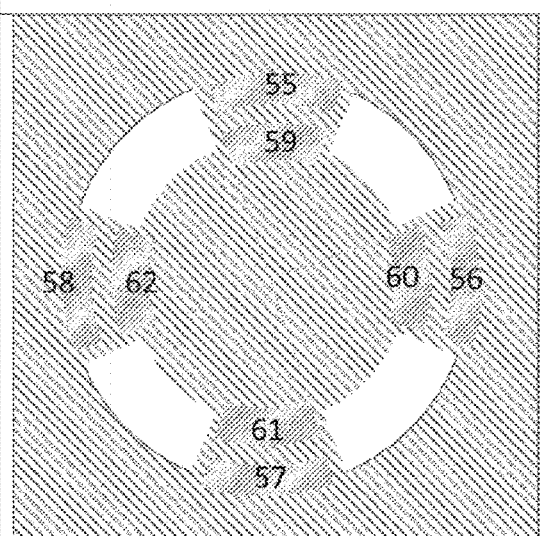
FIG. 15 illustrates a sixth possible embodiment of an actuator.
Figure 16:
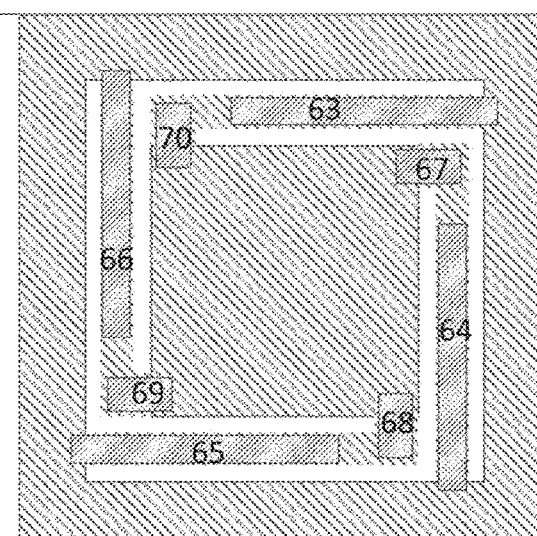
FIG. 16 illustrates a seventh possible embodiment of an actuator.

FIG. 14 shows an embodiment where each set of actuators consist of four elements, but where the membrane is not opened (has holes), while FIG. 15 shows a corresponding component with four beams. The advantage of the solution in FIG. 14 is that it is easier to process, while the disadvantage is that it gives less mechanical amplitude range given the same actuators and silicon layer thickness in the unimorph. FIG. 16 shows an embodiment with long actuator arms, and where the actuators 63, 64, 65 and 66 are suitable for adjusting the wavelength while the short actuators 67, 68, 69 and 70 are suitable for modulation (short and fast).

In all the embodiments above it is possible to switch the function of the inner and outer set of actuators, and it is possible to use different silicon thickness in the inner and outer actuators, and it is possible to change the thickness of the piezo-electric material (if used) in the inner and outer actuators. Use of a thinner piezoelectric material will be advantageous in the actuators used for modulation as the piezoelectric material is subjected to less mechanical stress when bending. The modulation length will also be less, but the advantage of less strain may be larger compared to the disadvantage. It is also possible to modify the strain on the piezoelectric material on the actuators for modulation. This may for example be done by making sure the material grows in a different way in the related area, and this may be done by altering the starting conditions for the growth of the PZT crystal.

In the figures the optical element 4 in the middle is either round or square, but the element may of course have any other suitable shape. The realization will mainly depend on the shape of the source and other optics.

In the figures and the specification we have only discussed the actuators per se. All actuators and electrodes have electrical connections with the surroundings (and driving electronics). Using capacitive sensors for measuring distances, it will be especially advantageous to make an extra distances being fixed, i.e. a dummy capacitance, so that one may compensate for temperature, pressure, humidity and other influences that may affect the capacitance and distance measurements.

To summarize the present invention relates to a Fabry-Perot interferometer including two plane mirror surfaces mounted in a frame, the mirrors have a known distance between them, and at least one of the mirror surfaces is both partially reflective and partially reflective thus providing a resonator. The interferometer is provided with at least two actuator units, each including at least one actuator, where the first actuator unit is adapted to adjust said distance between said mirrors thus defining a basic distance between the mirrors and therefore also a base wavelength. The second actuator unit is adapted to modulate said distance at a chosen frequency, the movements preferably having less amplitude that the adjustments made by the first actuator unit. The two actuator units together providing a variation over a range of mirror distances corresponding to a range of filtered wavelengths in said Fabry-Perot interferometer. At least one of said mirrors is related to the frame through a silicon membrane, at least one of said actuator units comprising a piezoelectric material on said membrane, thus constituting a bimorph or unimorph actuator unit.

Both actuator units may be bimorph or unimorph, or the second actuator unit may e.g. utilize electrostatic forces. The different types of actuators have different characteristics and thus, for example, PZT actuator units may be used for the general wavelength control while the modulation is applied using electrostatic forces.

The modulation as well as the adjustment is a parallel movement in relation to the optical axis of the filter so that the filtered wavelength is scanned back and forth. The modulation may preferably be a sinus while the adjusted, filtered wavelength is adjusted with a ramp, so that the wavelength is adjusted within a specified range, for example in a range of 3-6 micrometers or 7-14 micrometers. Alternatively the modulation movement is non-parallel thus applying a variable angle between the mirror planes so that the specter is sequentially broader and more narrow at an applied modulation.

Different positions of the actuator units may be contemplated. The first actuator unit and the second actuator unit may be positioned so as to move the same mirror in the Fabry-Perot interferometer, either both being mounted on the membrane at different radial positions or the second may for example be an electrostatic actuator. Alternatively the first actuator unit moves one mirror in the Fabry-Perot interferometer and the other actuator unit moves the second mirror in the Fabry-Perot interferometer.

The mirror distance corresponding to the filtered wavelength may be measured by measuring the capacitance between chosen areas, and by applying a modulation with only negative or only positive position relative to the wavelength position, the modulation depth may be measured.

The mirrors may be made from different types, dielectric, metal layered or may be constituted by a photonic crystal membrane or be based on surface plasmons.

The membrane is preferably made in one process to provide a controlled characteristics when the PZT elements or corresponding elements are mounted. Depending on the application the membrane may have openings, the bimorph or unimorph actuators being positioned on membrane arms extending from said frame to said mirror. The arms may have axial orientations or other solutions.

The invention also relates to a system including the Fabry-Perot interferometer discussed above, also including means for detecting the phase difference between applied modulation and real modulation changes with the wavelength, e.g. because of the squeeze film effect, the system being adapted to compensate by altering the amplitude and possibly phase of the applied modulation.

As discussed above a preferred use of the Fabry-Perot interferometer according to the invention is in a photoacoustic detector.

The invention claimed is:

1. A spectrometer for gas detection comprising a Fabry-Perot interferometer including two plane, essentially parallel, mirror surfaces mounted in a frame, the mirrors having a known distance between them, wherein at least one of the mirror surfaces is both partially reflective and partially transparent, where there are at least two actuator units, each including at least one actuator, wherein the first actuator unit is adapted to adjust the distance between the mirrors so as to adjust the filtered wavelength within a specified range and wherein the second actuator unit is adapted to modulate the distance at a chosen frequency in the range of 10-1000 Hz, both thus providing a variation over a range of mirror distances corresponding to a range of filtered wavelengths in the Fabry-Perot interferometer, and wherein the amplitude of the movements of the second actuator modulation is less than the amplitude of the movements made by the first actuator unit;

wherein at least one of the mirrors is related to the frame through a silicon membrane, at least the second of the actuator units comprising a piezoelectric material on the membrane, thus constituting a bimorph or unimorph actuator unit; and wherein the second actuator unit is operated at a lower strain than the first actuator unit so as to increase actuator lifetime.

2. The spectrometer according to claim 1, where modulation is a parallel movement in relation to the optical axis of the filter so that the filtered wavelength is scanned back and forth.

3. The spectrometer according to claim 1, where the modulation is sinusoidal.

4. The spectrometer according to claim 1, where the filtered wavelength is adjusted with a ramp, so that the wavelength is adjusted within a specified range.

5. The spectrometer according to claim 1, where the first actuator unit and the second actuator unit moves the same mirror in the Fabry-Perot interferometer.

6. The spectrometer according to claim 1, where the first actuator unit moves one mirror in the Fabry-Perot interferometer and the other actuator unit moves the second mirror in the Fabry-Perot interferometer.

7. The spectrometer according to claim 1, where the adjusted mirror distance corresponding to the adjusted filtered wavelength is measured by measuring the capacitance between chosen areas, and by comparing the averaged filtered wavelength with and without modulation.

8. The spectrometer according to claim 1, where modulation is not a parallel movement so that the filtered wavelength specter is sequentially broader and more narrow at an applied modulation.

9. The spectrometer according to claim 1, where at least one of the mirrors is a photonic crystal membrane.

10. The spectrometer according to claim 1, where at least one of the mirrors is based on surface plasmons.

11. The spectrometer according to claim 1, wherein the membrane includes openings, the bimorph or unimorph actuators being positioned on membrane arms extending from the frame to the mirror.

12. The spectrometer according to claim 1, where at least one actuator unit utilizes electrostatic forces.

13. The spectrometer according to claim 1, including means for detecting the phase difference between applied modulation and real modulation changes with the wavelength, e.g. because of the squeeze film effect, the system being adapted to compensated by altering the amplitude and possibly phase of the applied modulation.

14. The spectrometer according to claim 1, wherein the light transmitted through the interferometer is detected using harmonic detection, where the signal is demodulated at frequencies f, 2f, 3f, 4f, or a higher multiple of the frequency.

15. The spectrometer according to claim 13, wherein the phase difference is because of the squeeze film effect.

\* \* \* \* \*